Figure 1:
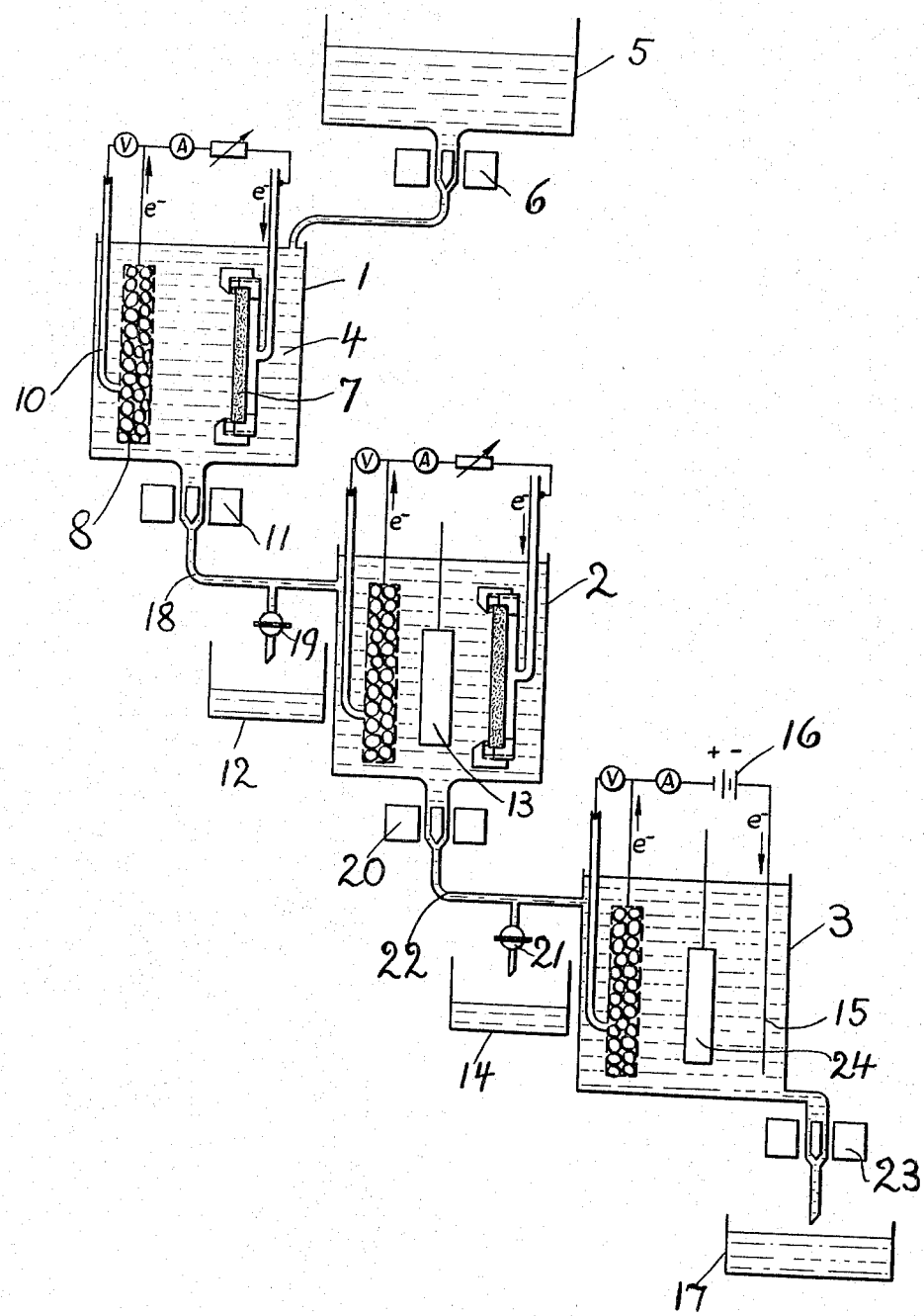

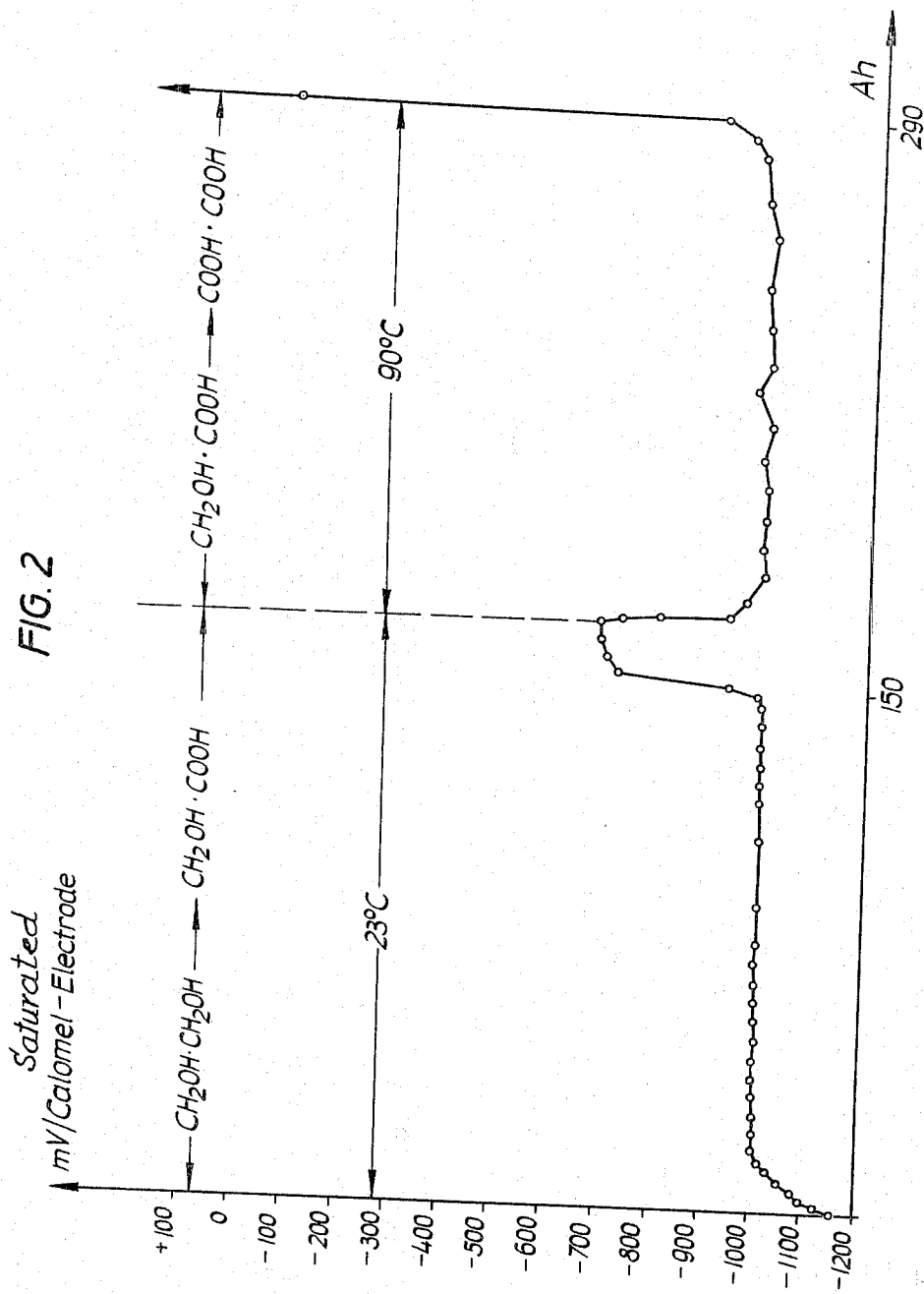

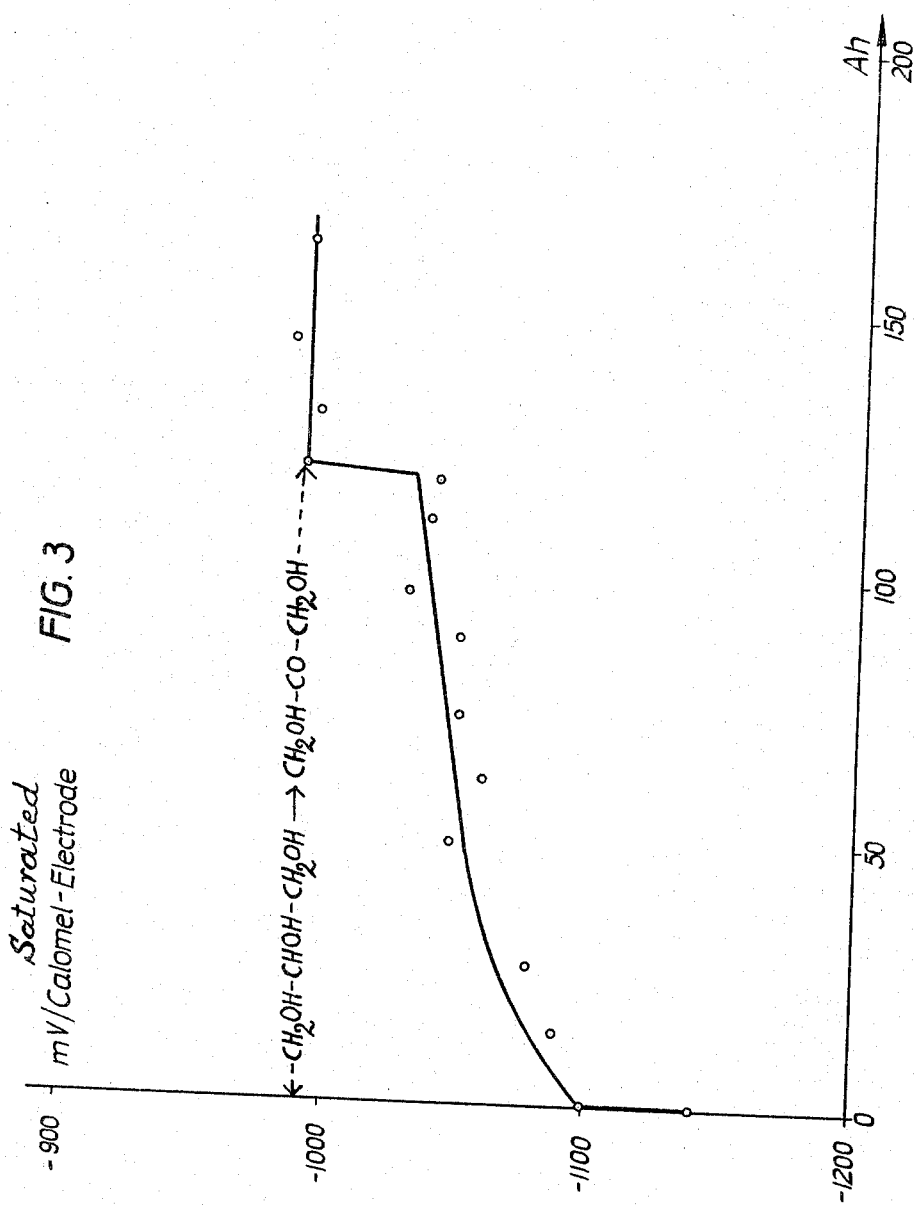

United States Patent Office 3,316,161
Patented Apr. 25, 1967

3,316,161
ELECTROCHEMICAL PROCESS OF AND APPARATUS FOR REPLACING HYDROGEN IN OXIDIZABLE CHEMICAL COMPOUNDS BY A FUNCTIONAL GROUP
Margarete Jung, Nieder-Eschbach, Taunus, and Gerhard Grueneberg, Bonn (Rhine), Germany, assignors to Siemens-Schuckertwerke Aktiengesellschaft and Varta Aktiengesellschaft, Berlin and Erlangen, and Hagen, Westphalia, Germany, respectively, both corporations of Germany
Filed May 31, 1963, Ser. No. 284,558
Claims priority, application Germany, June 2, 1962, A 40,356
19 Claims. (Cl. 204—79)

The present invention relates to the electrochemical conversion of chemical compounds and more particularly of oxidizable chemical compounds into predetermined other organic compounds, and more particularly to the controlled substitution of hydrogen in such compounds by a functional oxygen-containing group.

According to known processes, the hydrogen present in oxidizable chemical compounds can be replaced by hydroxyl groups or oxygen atoms, for instance, by oxidation by means of sufficient amounts of oxidizing agents such as silver oxide, potassium permanganate, hydrogen peroxide, vanadium pentoxide, persulfates, and others. However, in this process the oxidation usually proceeds to the highest stage of oixdation which can be obtained in the respective reaction medium. At the same time, the other reactant is reduced to reduction products the separation of which from the oxidation products requires special and usually complicated operations for working up the reaction mixture and producing the oxidized compound in a pure state.

When operating with less than the required amount of oxidizing agent, either various intermediate products are formed simultaneously or only part of the starting material is converted into the highest stage of oxidation which can possibly be attained. Furthermore, it is frequently rather difficult to conduct the heat of reaction released on oxidation away from the reaction zone.

It is also known that chemical compounds can be oxidized anodically at an oxygen electrode. Thereby, the starting materials are also oxidized to the oxidation stage corresponding to the respective medium. When using organic compounds as starting materials, carbon to carbon bonds may even be split up.

In both these known processes it has been found difficult, if not impossible, to stop oxidation at any predetermined desired oxidation stage and to recover any such oxidation product in pure form, without taking special measures.

When carrying out halogenation reactions, similar conditions are encountered.

In fuel cells, an organic fuel, such as a hydrocarbon or an oxygen containing organic compound, such as an alcohol, aldehyde, ketone, ether, or ester, is directly converted into electrical energy and simultaneously oxidized in various stages until it has been converted into carbon dioxide. Such fuel cells include an anode or fuel electrode, a cathode or oxygen electrode, respective supplies of an organic fuel, an oxidizing agent consisting of, or containing, molecular oxygen, and an aqueous electrolyte wherein the electrodes are immersed. With the use of an alkaline electrolyte, oxygen is reacted with the aqueous electrolyte solution to form negatively charged ions at the cathode, fuel is oxidized at the anode, and free electrons are released upon a conducting surface of the anode. When an acidic electrolyte is used, hydrogen ions formed at the anode migrate to the cathode where water is formed. When current is drawn from the cell, there is a net flow of electrons from the anode through an external circuit to the cathode.

During this direct conversion of the chemical energy of the hydrocarbon fuel to electrical energy, the fuel is oxidized in various stages until it has been converted into carbon dioxide. In these dehydrogenation stages, different intermediate compounds are formed and subsequently the resulting mixture of oxidation products had to be separated from each other.

It is one object of the present invention to provide a simple and effective electrochemical process of directly producing definite oxidation products of any desired predetermined intermediate stage of oxidation.

Another object of the present invention is to provide a highly effective apparatus for carrying out said process.

Other objects and advantageous features of the present invention will become apparent as the description procedes.

According to the present invention it has been found that the end of each stage, and the corresponding formation of a definite, predetermined compound, is clearly indicated by a sudden change in the anode potential. Thus, when the electrochemical conversion is controlled by interrupting it at the point of the sudden potential change, the predetermined compound may be recovered in pure form.

In accordance with the present invention, the electrochemical conversion of an oxidizable organic compound is controlled stage by stage, as said compound is converted into another compound at each stage until it has finally been oxidized to carbon dioxide. In this process, a hydrogen in the respective compound is activated, usually catalytically, to make the hydrogen reactive. This activation is effected by contacting the compound with a suitable electrode and, with presently known hydrogen electrode materials, it has been found that the hydrogen in aliphatic or aromatic hydrocarbons cannot be activated sufficiently to be exchanged for other functional groups at atemperatures below about 250° C. The control according to the invention is accomplished by operating the hydrogen electrode at a potential below that of oxygen dissociation because nascent oxygen has been found to prevent a controlled, stepwise oxidation. When organic compounds with activated hydrogen relatively loosely bound thereto are used, the electrode will be operated just slightly above the reversible hydrogen potential since the dissociation energy of the hydrogen is small in such cases.

When the hydrogen electrode is operated at a potential below that of oxygen dissociation without substantially changing such operating factors as the electrode material, the electrolyte composition, concentration and temperature, the organic compound or fuel and/or oxidant pressures, and the like, the completion of each conversion stage will be clearly marked by a sharp change in the electrode potential. This marked change in the electrode potential at the end of each conversion stage will be further increased if more active electrode material, higher operating temperature, and higher pressure are used.

The sudden electrode potential change indicates the quantitative conversion of the organic compound in the given stage, i.e. the replacement of a given reactive hydrogen in said compound or fuel by a functional group, so that a predetermined other compound is produced. At this point, the external circuit is interrupted, i.e. the operation of the hydrogen electrode is discontinued and the thus produced compound may be recovered in its pure form. If desired, however, the electrolyte containing this compound may be fed to another electrochemical conversion process where different reaction conditions may be used to improve the succeeding dehydrogenation stage.

In the controlled electrochemical conversion process of this invention, the free electrons released therein are available in the form of electrical energy as they migrate from the terminal of the one electrode to the terminal of the other electrode while the anions of the electrolyte combine with the dehydrogenated organic compound or fuel in each stage of the conversion. Additional ions formed at the cathode and delivered into the electrolyte combine with the hydrogen stored in the anode operating at a potential below that of oxygen dissociation and usually around the reversible hydrogen potential. In contrast to usual chemical substitution processes, such as oxidation, where heat energy is formed, the reaction energy is freed in the electrochemical conversion is available as electrical energy and, even where such energy is not available, the electrical energy required for the process is much smaller than in conventional chemical conversions.

By strictly controlling the electrode potential, it is possible to interrupt the replacement or substitution process at the exact point where the desired conversion or substitution stage has been reached. This point may be readily determined when a reference electrode connected to the anode indicates a sudden potential change or jump.

Successive dehydrogenation stages may be effected at different electrode voltages or at the same voltage if the electrolyte temperature is suitably changed to obtain the desired substitution. If the starting compound is to be converted into a succession of different compounds, the successive substitution stages are preferably carried out in successive reaction chambers. Usually, the ease of substituting a reactive hydrogen atom in the organic compound by another functional group decreases from stage to stage, i.e. the dehydrogenation, for instance, proceeds with increasing difficulty. Therefore, the voltage obtainable from the reactor becomes smaller and, while the production of electrical energy in this electrochemical conversion process may be of secondary importance in many practical applications, it is, nevertheless, desirable to operate the system with constant voltage and current intensity. This can readily be accomplished if the last reaction chamber or fuel cell in the series of dehydrogenation chambers has a hydrogen electrode of the most negative potential and the highest catalytic activity.

In such a system of successive stages of conversion, dehydrogenation is effected at each stage until the desired product is produced, at which point the electrode circuit is interrupted. The desired amount of the product is then recovered and, while the next conversion stage may then be carried out in the same cell, it is preferred to proceed in another cell where stronger dehydrogenation catalysts and/or more active anodes may be used to expedite the reaction in the succeeding stage, the reaction being further speeded up and better voltages being obtained if the reaction temperature is increased from stage to stage. This also facilitates the substitution of less reactive hydrogen atoms.

A system of this type is illustrated by way of example in the accompanying drawing wherein FIG. 1 shows an automatically operating plant for three stages of dehydrogenation; and FIGS. 2 and 3 show voltage curves in the dehydrogenation of specific hydrocarbon fuels.

Referring now to FIG. 1, there is shown an arrangement of three fuel cells connected in series for the dehydrogenation of an oxidizable organic fuel in three stages. This arrangement will be described herein in connection with the use of glycerol, $CH_2OH.CHOH.CH_2OH$, as the fuel and of 6 N potassium hydroxide solution as electrolyte. The fuel is mixed with the electrolyte at a ratio of 2.36 moles of glycerol per liter of electrolyte and this mixture is stored in container 5 whence it is supplied to the first fuel cell 1 through solenoid valve 6. The valve is automatically opened in response to the voltage jump measured at the fuel cell anode when the first stage of dehydrogenation is completed, at which point electrolyte containing the dehydrogenated fuel is drained from cell 1 and an additional amount of the starting mixture is delivered to the cell from storage container 5. Thus, the process proceeds stepwise, i.e. discontinuously.

As is conventional, oxygen electrode 7 and hydrogen electrode 8 are immersed in the electrolyte in fuel cell 1. The preferred oxygen electrode is a double-skelton Raney silver electrode and such an electrode as disclosed, for instance, in Example 4 of U.S. Patent No. 3,073,697 has been successfully used. Air is supplied to this electrode through conduit 9. Useful anodes are disclosed in U.S. Patent No. 2,925,454, for instance, and such Raney nickel anodes as disclosed in the example of this patent have been successfully used.

The entire inner surface area of the fuel electrode must be electrochemically active to permit effective activation of the hydrogen atoms in the fuel.

The electrochemical reaction in cell 1 proceeds at a temperature in the interior of the cell of about 100° C. and the capacity of the cell is one liter of the fuel-electrolyte mixture.

The normal voltage of the electrode 8 is observed by means of a calomel reference electrode 10 connected to the surface of the electrode 8. The electric current flowing between anode and cathode during the operation of the cell is measured by an ampere-hour meter A. In the illustrated test system, the current flow is controlled by a variable resistance but, in practice, a load may be connected to the terminal circuit.

As explained hereinabove, each stage of dehydrogenation of the fuel in the cell is signaled by a voltage jump, i.e. a sudden change of the potential of the fuel electrode 8. When the reference electrode registers this voltage change, the terminal circuit of cell 1 is interrupted and a suitable control circuit (not shown) leading from the reference electrode to solenoid valve 11 is actuated to open the valve, thereby to drain the electrolyte containing the dehydrogenation product from cell 1. After the cell has been emptied, valve 11 is closed and valve 6 is opened to fill the cell with a new starting mixture from container 5. A suitable time relay or other means opens and closes the valves after the mixture in the cell has been thus replaced.

The dehydrogenated compound of the first stage is dihydroxy acetone, $CH_2OH.CO.CH_2OH$, one molecule of hydrogen, $H_2$, having been removed from the glycerol.

Connecting conduit 18 delivers the mixture drained from fuel cell 1 to the succeeding fuel cell 2 when solenoid valve 11 is open but half of the drained mixture is recovered in a container 12 by opening valve 19 in conduit 18.

Dehydrogenation in the second cell proceeds analogously to that in the first cell. The temperature of the mixture of dihydroxy acetone and 6 N potassium hydroxide electrolyte is again held at 100° C. by floating calandria 3 and one of the $CH_2OH$-groups is converted into a carboxyl group, COOH, by way of aldehyde stage. The oxygen electrode in cell 2 is the same as that in cell 1 while the fuel electrode is a catalyst sieve electrode such as disclosed, for instance, in FIG. 2 of British patent specification No. 907,351.

In the electrochemical conversion in the second stage, electrical energy corresponding to four free electrons per molecule of the dehydrogenated fuel is made available and the amount of current is the same as in the first stage where one liter of the fuel-electrolyte mixture produced two free electrons per fuel molecule.

The potential in the first stage was 0.74 v. and the dehydrogenation lasted 118 hours at a current discharge of one ampere. In the second stage, the voltage was 0.63 v. and the output was 113 ampere-hours (theoretical output: 124 ampere-hours). The double-skelton Raney silver electrode was operated in the second stage with technically pure oxygen while the fuel sieve electrode was filled with Raney nickel grains.

After an output of one ampere for 113 hours, a sudden potential change was indicated by the reference electrode to signify the completion of the second conversion stage. Accordingly and in the same manner as in the first stage, the solenoid valve 20 is automatically opened in response to the indication on the reference electrode and the electrolyte-dehydrogenated fuel mixture is drained out of fuel cell 2 into fuel cell 3. For experimental purposes half of the mixture is recovered in container 14 by opening valve 21 in the connecting conduit 22, the rest of the mixture being supplied to the third dehydrogenation stage in cell 3.

The fuel electrode is a catalyst sieve electrode as described in British patent specification No. 907,351, containing an active carbon catalyst activated with palladium, again the oxygen electrode being a double-skeleton Raney silver electrode fed with technically pure oxygen.

The dehydrogenation temperature in the third stage is increased by 10° C. to 110° C. by heating element 24 so as to produce as complete a conversion to mesoxalic acid as possible, the output of fuel cell 3 is kept to half an ampere. Theoretically, an output of 62 ampere-hours may be expected since four electrons per fuel molecule may be expected to be freed in the electrochemical conversion in the third stage. In fact, the voltage of cell 3 starts at 0.7 v. and decreases in the course of 102 hours (51 ampere-hours) to a value of 0.5 v., at this point the significant voltage jump occurs to indicate the completion of the conversion of the fuel to mesoxalic acid, $$COOH.CO.COOH$$

When the calomel reference electrode connected to the fuel electrode of cell 3 indicates the sudden voltage change, it automatically opens solenoid valve 23 to drain the end product from the cell into container 17 while the current supply to electrode 15 is shut off.

It shall be noted that cell 3 in FIG. 1 is not the cell 3 as just described in the third stage of the dehydrogenation of glycerol.

Cell 3 in FIG. 1 is a so-called "half-cell." The fuel electrode shown is a catalyst-sieve electrode as mentioned before while the counter-electrode 15 is a nickel sheet which takes the place of the described double-skeleton Raney silver electrode. These two electrodes are connected to a direct-current generator 16 whereby it is also possible to dehydrogenate organic compounds without evolving oxygen. The required voltage is about 1 v. below the voltage of a corresponding electrolytic process but naturally there is no gain of potential energy.

As will be noted from the above example, three different, substantially pure organic compounds have been selectively produced from a glycerol starting material in three stages sharply determined and controlled by a sudden change of potential at the fuel electrode. In this chemical conversion process, simultaneously electrical energy has been produced. To produce useful electrical energy at a relatively constant voltage, the dehydrogenation catalysts at the electrodes in the successive stages have been selected so that all cells deliver about the same potential. Since dehydrogenation usually becomes more difficult in succeeding stages, suceeding catalysts are made increasingly more active and, if the reaction products are thermally stable, it is advantageous to support this by increasing the temperature and the pressure under which the reactions proceed, increase in the pressure reducing the boiling point of the electrolyte and the organic compounds.

In the order of decreasing activity, the following catalysts have been found useful in this process which, however, is not limited thereto:

With alkaline electrolytes: Raney nickel and palladium precipitated on activated carbon; cobalt powder; carbonyl nickel activated with boranates; and nickel powder.

With acidic electrolytes: Very finely divided platinum or iridium, such as platinum precipitated on activated carbon.

The chart of FIG. 2 shows the selective two-step oxidation of ethylene glycol, $CH_2OH.CH_2OH$, to glycollic acid, $CH_2OH.COOH$, and to oxalic acid, $COOH.COOH$. The curve is plotted against the potential of the fuel electrode indicated in millivolts on a connected saturated calomel reference electrode and the ampere-hour output of the fuel cell or cells wherein the electrochemical conversion process proceeds. The starting material consisted of one liter of a mixture of 5.2 N potassium hydroxide electrolyte containing 1.5 moles of ethylene glycol. The concentration of the electrolyte had to be lowered in this instance because the use of 6 N potassium hydroxide solution caused the potassium salt of glycollic acid to precipitate.

A sieve catalyst electrode filled with Raney nickel was used in both stages, like the one used in fuel cell 2 of FIG. 1. The operating temperature in the first stage was 23° C. and this was raised to 90° C. in the second stage wherein glycollic acid was oxidized to oxalic acid. The theoretical output was 161 ampere-hours but actually 77 ah. were produced in the first cell and 74.5 ah. in the second cell.

The oxygen electrode in the first fuel cell was a diffusion electrode consisting of activated carbon and low-pressure polyethylene. The mixture consisted of 22.5 g. of activated carbon intimately mixed with 7.5 g. of polyethylene, about 60% of the carbon having a particle size of $20\mu$ to $60\mu$, the balance of the particles being smaller. This electrode was provided with a silver oxide, $Ag_2O$, layer by mixing 5 g. of the carbon polyethylene mixture with 6 g. of silver oxide powder. The resulting mixture, together with a wide-mesh silver net provided with a contact lug was compressed in a suitable mold. Thereafter, the remainder of the carbon-polyethylene mixture was pressed to the first layer to form the electrode and this electrode was placed into the cell with the silver oxide-containing layer facing the electrolyte.

The oxygen electrode in the second fuel cell was one described in German Patent No. 1,137,779.

The voltage curve of FIG. 2 clearly shows the sudden jump of the electrode potential at the completion of each oxidation step, at which point the reaction is interrupted to recover he respective pure oxidation product.

FIG. 3 shows the potential curve of the first stage of the process described in connection with FIG. 1, wherein glycerol is converted to dihydroxy acetone, beginning with the rest potential of the dehydrogenation electrode and ending with its rest potential after the reaction has been interrupted.

While the dehydrogenation has been shown as proceeding in a fuel cell delivering useful electrical energy, it could, of course, also be carried out in a half-cell.

In other runs, cyclohexanol has been converted to cyclohexanone and, by using dissolving aid intermediaries, such as neutral soaps, phenoxyethanol

has been converted to phenoxy acetic acid.

Also, while the invention has been exemplified by the substitution of hydrogen by oxygen-containing functional groups, similar results will be achieved if the oxidation process is replaced by a halogenation process. Thus, if the electrolyte is hydrochloric acid and the oxidant is chlorine, the hydrogen will be replaced by chlorine in the molecule of the organic compound.

All organic compounds which pass through an additional dehydrogenation stage before they are completely dehydrogenated to carbon dioxide can be used for the process according to the present invention. Thus the process finds general application in the oxidation as well as halogenation of organic compounds.

It has proved of considerable value in the step-wise oxidation or, respectively, dehydrogenation of polyalcohols whereby hydroxy ketones, hydroxy carboxylic acids, keto carboxylic acids, or polycarboxylic acids are obtained. It has also been used in the oxidation of primary and secondary alcohols to the corresponding ketones and carboxylic acids.

It is also possible to start with aldehydes and to convert them into carboxylic acids.

Aromatic amino compounds may be dehydrogenated to hydroxylamines, nitroso compounds, or nitro compounds. Azo compounds may be obtained by dehydrogenation of hydrazo compounds or primary amines, likewise azoxy compounds by dehydrogenation of azo compounds or amines, and quinones by dehydrogenation of hydroquinones and the like.

If water-insoluble fuels are used, it is necessary to employ suitable dissolving intermediaries to permit their admixture with the aqueous electrolyte. Such dissolving intermediaries are the so-called neutral soaps which consist of a high molecular fatty acid radical bearing 3 to 20 ethylene oxide groups and an alcohol radical. Water readily adds to the oxygen bridges between the ethylene oxide groups, and this water then constitutes the basis for the addition of ions and, consequently, for an electrical conductivity.

The present invention has been described in connection with certain specific embodiments but it will be clearly understood that many variations and modifications may occur to those skilled in the art without departing from the spirit and scope of the invention as defined in the appended claims.

We claim:

1. A process for electrochemically dehydrogenating an organic fuel compound into another organic compound, said organic fuel having a plurality of reactive hydrogen atoms which are electrochemically oxidizable in successive stages which comprises contacting the organic fuel with a dehydrogenation electrode to activate a hydrogen atom in said fuel, maintaining the electrode at a measured potential below that of oxygen dissociation during operation of the electrode, discontinuing operation of the electrode when a marked change of potential is measured, at which point at least one reactive hydrogen has been removed from and replaced on the fuel compound, the same having been converted into a lesser hydrogenated other organic compound, and separating at least a portion of the lesser hydrogenated compound obtained at that stage.

2. A process for electrochemically dehydrogenating an organic fuel compound into another organic compound, said organic fuel having a plurality of reactive hydrogen atoms which are electrochemically oxdizable in successive stages with increasing difficulty which comprises contacting the organic fuel in an electrolyte with a dehydrogenation electrode to activate a hydrogen atom in said fuel, dehydrogenating the fuel while maintaining the dehydrogenation electrode at a measured potential below that of oxygen dissociation until the potential suddenly jumps, at which point at least one reactive hydrogen atom has been removed from the fuel and the same has been converted into a lesser hydrogenated other organic compound, interrupting the electrical connection between the electrodes at this point, recovering at least a portion of the lesser hydrogenated compound obtained at that stage, and subjecting said lesser hydrogenated compound to further electrochemical dehydrogenation thereby converting it into at least one further dehydrogenated organic compound product.

3. The process of claim 2, wherein the removed hydrogen is substituted by an atom of the oxidant.

4. The process of claim 2, wherein the oxidant is oxygen.

5. The process of claim 2, wherein the further dehydrogenated organic compound product is subjected to a further dehydrogenation to convert the same into a further dehydrogenated organic compound.

6. The process of claim 15, wherein the further dehydrogenation stages are carried out at the same electrode potential as the preceding dehydrogenation stage but at an increasingly higher temperature.

7. A three-stage process of converting glycerol into three distinct organic compounds, comprising the steps of mixing glycerol with an alkaline electrolyte, feeding the mixture to a first fuel cell including a hydrogen electrode and an oxygen electrode, connecting the electrode terminals with an electric conductor, maintaining the hydrogen electrode at a potential below that of oxygen dissociation until the potential suddenly jumps, at which point two hydrogen atoms have been removed from the glycerol to convert it to $\alpha,\gamma$-dihydroxy acetone, interrupting the electrical connection between the electrodes at this point, feeding a portion of the electrolyte-organic compound mixture from the first fuel cell to a second fuel cell also including a hydrogen electrode and an oxygen electrode, connecting the latter electrode terminals with an electric conductor, maintaining the latter hydrogen electrode at about said potential until the same suddenly jumps, at which point one of the primary alcohol groups of the $\alpha,\gamma$-dihydroxy acetone has been converted into a carboxyl group to yield hydroxy pyroracemic acid, interrupting the electrical connection between the electrodes at this point, feeding a portion of the mixture of the electrolyte and said last-named compound to a third fuel cell also including a hydrogen electrode and an oxygen electrode, connecting the latter electrode terminals with an electric conductor, maintaining the latter hydrogen electrode at about said potential until the same suddenly jumps, at which point the other one of the $CH_2OH$-group has been converted into a carboxyl group to yield mesoxalic acid, interrupting the electrical connection between the electrodes at this point, and recovering the mixture from the third fuel cell.

8. A two-stage process of converting ethylene glycol into glycollic acid and into oxalic acid, comprising the steps of mixing ethylene glycol with an alkaline electrolyte, feeding the mixture to a first fuel cell including a hydrogen electrode and an oxygen electrode, connecting the electrode terminals with an electric conductor, maintaining the hydrogen electrode at a potential below that of the dissociation oxygen until the potential suddenly jumps, at which point the ethylene glycol has been converted into glycollic acid, interrupting the electrical connection between the electrodes at this point, recovering a portion of the glycollic acid-electrolyte mixture, feeding another portion of said mixture to a second fuel cell also including a hydrogen electrode and an oxygen electrode, connecting the latter electrode terminals with an electrode conductor, maintaining the latter hydrogen electrode at about said potential until the same suddenly jumps, at which point the glycollic acid has been converted into oxalic acid, interrupting the electrical connection between the electrodes at this point, and recovering the mixture of the electrolyte and the oxalic acid.

9. A multi-stage multi-fuel cell system for the electrochemical conversion of an organic fuel into distinct other organic compounds said system having a supply of an electrolyte mixed with said organic fuel, comprising a plurality of connected fuel cells each including a hydrogen electrode and an oxygen electrode, conduit means connecting successive ones of said cells to each other, valve means in said conduit means, an electrical conductor connecting the hydrogen electrode and the oxygen electrode of each of said cells to each other, means for opening said valve means in the conduit means between two successive ones of said cells in response to a sudden jump in the hydrogen electrode potential of a first one of said successive cells and like means in the successive cells for opening said valve means in response to a sudden change of said potential of the hydrogen electrode of successive cells, whereby the electrolyte-fuel mixture comprising a dehydrogenated product is drained from said first cell into the successive cell, and from said successive cell to a successive cell, and valve means in said conduit means for removing a portion of said mixture.

10. The multi-stage system of claim 9, wherein the hydrogen electrode in each successive fuel cell is more active than in the preceding one.

11. The multi-stage system of claim 9, further comprising means for heating each fuel cell.

12. The process of claim 2 in which at the mentioned stage essentially all of the organic product is recovered.

13. The process of claim 2 which comprises the step of maintaining the hydrogen electrode at a potential just above the reversible hydrogen potential.

14. The process of claim 2 in which there is separated at each distinct dehydrogenation stage a separate organic compound product.

15. An electrochemical process for dehydrogenating an organic fuel compound into another organic compound, said organic fuel having a plurality of reactive hydrogen atoms which are electrochemically dehydrogenable in successive stages, which comprises contacting the organic fuel with a dehydrogenation electrode thereby activating at least one hydrogen atom in said fuel, maintaining the hydrogen electrode at a measured potential below that of oxygen dissociation while dehydrogenating the fuel, discontinuing operation of the electrode when a marked change of potential is measured, at which time at least one reactive hydrogen has been removed from the fuel and the same has been dehydrogenated into a lesser hydrogenated organic compound product, separating at least a portion of the organic compound product obtained at that stage, and subjecting a portion of said product to further electrochemical dehydrogenation and recovering at least a portion of the further dehydrogenated compound.

16. The process of claim 2 in which each dehydrogenation stage is carried out at a hydrogen electrode having an increasingly more negative potential and higher catalytic activity.

17. The process of claim 1 in which the electrical energy is maintained at relatively constant voltage.

18. The process of claim 15 which is discontinued prior to complete dehydrogenation of the fuel to carbon dioxide.

19. The process of claim 15 in which at each consecutive dehydrogenation stage there is separated a further dehydrogenated organic compound product.

References Cited by the Examiner

UNITED STATES PATENTS

| | | | |
|---|---|---|---|
| 2,925,454 | 2/1960 | Justi et al. | 136—86 |
| 2,925,455 | 2/1960 | Eidensohn et al. | 136—86 |
| 3,117,954 | 1/1964 | Hupfer | 23—230 |

OTHER REFERENCES

"How to Make a Demonstration Fuel Cell," Esso Research and Engineering Company, Linden, New Jersey, 1961, pp. 3.

HOWARD S. WILLIAMS, *Primary Examiner.*

JOHN H. MACK, *Examiner.*

H. M. FLOURNOY, *Assistant Examiner.*